United States Patent
Bekkerman (10) Patent No.: US 11,615,150 B2
(45) Date of Patent: Mar. 28, 2023

(54) NEIGHBORHOOD-BASED ENTITY DISAMBIGUATION SYSTEM AND METHOD

(71) Applicant: Cherre, Inc., New York, NY (US)

(72) Inventor: Ron Bekkerman, Tenafly, NJ (US)

(73) Assignee: Cherre, Inc., New York, NY (US)

( * ) Notice: Subject to any disclaimer, the term of this patent is extended or adjusted under 35 U.S.C. 154(b) by 159 days.

(21) Appl. No.: 17/067,170

(22) Filed: Oct. 9, 2020

(65) Prior Publication Data

US 2022/0114215 A1  Apr. 14, 2022

(51) Int. Cl.
| | |
|---|---|
| *G06F 16/906* | (2019.01) |
| *G06F 16/903* | (2019.01) |
| *G06F 16/9538* | (2019.01) |
| *G06N 5/022* | (2023.01) |

(52) U.S. Cl.
CPC ...... *G06F 16/906* (2019.01); *G06F 16/90335* (2019.01); *G06F 16/9538* (2019.01); *G06N 5/022* (2013.01)

(58) Field of Classification Search
CPC ............. G06F 16/906; G06F 16/90335; G06F 16/9538; G06N 5/022
USPC ........................................................ 707/737
See application file for complete search history.

(56) References Cited

U.S. PATENT DOCUMENTS

| | | | | |
|---|---|---|---|---|
| 11,030,534 | B2* | 6/2021 | Fothergill | G06F 16/9024 |
| 2013/0346421 | A1* | 12/2013 | Wang | G06F 40/295 |
| | | | | 707/755 |
| 2014/0074764 | A1 | 3/2014 | Duftler et al. | |
| 2014/0280307 | A1* | 9/2014 | Gupta | G06F 16/3331 |
| | | | | 707/769 |
| 2015/0356202 | A1* | 12/2015 | Yampolska | G06F 16/35 |
| | | | | 707/755 |
| 2018/0189634 | A1* | 7/2018 | Abdelaziz | G06N 3/04 |
| 2018/0357238 | A1* | 12/2018 | Cowan | G06F 16/9535 |

(Continued)

FOREIGN PATENT DOCUMENTS

TW         201807602 A  *  3/2018 ............. G06F 16/00

OTHER PUBLICATIONS

Huang et al., "Leveraging Deep Neural Networks and Knowledge Graphs for Entity Disambiguation", arXiv:1504.07678v1 [cs.CL], Apr. 28, 2015, 10 pages. (Year: 2015).*

(Continued)

*Primary Examiner* — Phuong Thao Cao
(74) *Attorney, Agent, or Firm* — Dovas Law, P.C.

(57) ABSTRACT

A data processing method includes receiving data from a plurality of sources, generating a knowledge graph, and identifying potentially ambiguous particular nodes. For each of the particular nodes a semantic neighborhood is constructed including the particular node and a plurality of nodes within a particular degree of separation from the particular node, the particular node is omitted from the semantic neighborhood, a plurality of groups of connected nodes are determined in the semantic neighborhood, a plurality of instances of the particular node are defined, a plurality of substitute nodes are generated based on the plurality of instances, and each of the plurality of groups of connected nodes are connected to one of the plurality of substitute nodes to update the knowledge graph. A query is received via a network. Query results are retrieved out of the updated knowledge graph, and the query results are rendered accessible.

28 Claims, 5 Drawing Sheets

(56) References Cited

U.S. PATENT DOCUMENTS

| | | | |
|---|---|---|---|
| 2019/0188324 A1* | 6/2019 | Zhao | G06N 3/08 |
| 2019/0278777 A1 | 9/2019 | Malik et al. | |
| 2019/0354883 A1* | 11/2019 | Aravamudan | G16B 50/10 |
| 2020/0081917 A1* | 3/2020 | Hirmer | G06F 16/9537 |
| 2020/0167376 A1 | 5/2020 | Aravamudan et al. | |
| 2020/0257730 A1* | 8/2020 | Srinivas | G06N 20/00 |
| 2022/0051110 A1 | 2/2022 | Bekkerman et al. | |
| 2022/0101151 A1* | 3/2022 | Portisch | G06N 5/022 |

OTHER PUBLICATIONS

John Hopcroft and Robert Tarjan, Efficient Algorithms for Graph Manipulation, Cornell University, Ithaca, NY, Mar. 24, 1971.
Inrernational Search Report dated Jan. 12, 2022 for PCTUS2152062.
International Preliminary Report On Patentability dated Dec. 7, 2022 for PCTUS2152062.
International Preliminary Report On Patentability dated Mar. 4, 2022 for PCTUS21045783.
International Search Report dated Nov. 15, 2021 for PCTUS-2021045783.
L. Hermansson, T Kerola, F Johansson, V Jethava and D Dubhashi, Entity Disambiguation in Anonymized Graphs Using Graph Kernels, https://doi.org/10.1145/2505515.2505565, pp. 1037-1046, Oct. 2013.

* cited by examiner

NEIGHBORHOOD-BASED ENTITY DISAMBIGUATION SYSTEM AND METHOD

FIELD OF INVENTION

The invention relates generally to processor-enabled entity disambiguation, and more particularly to processor-enabled neighborhood-based entity disambiguation.

BACKGROUND

Computer systems need to be able to identify, store, and recall indications of real-world entities. Computer systems in communication with each other may further need to disambiguate identities of entities, that is, to agree whether a particular entity is actually two or more entities, in order to exchange information about the particular entity and retain information about the entity without having complete information about the entity. When multiple computer systems in a computer network are required to exchange data relating to a particular entity to facilitate a transaction, disambiguating entities becomes more challenging. The disambiguating of entities is frequently time sensitive, and delays in disambiguating an entity may affect the ability of a transaction to be completed.

Many industries rely on publicly sourced network-accessible data, the quality and accuracy of which is not always easily ascertained. Disambiguating entities based on such data can be computationally intensive based on the volume and quality of the data. The real estate industry in particular is faced with data from various disparate municipalities which is maintained at different levels of government, including for example borough, city, county, and state governments.

A knowledge graph enables organizing and analyzing knowledge in a computing environment. In a knowledge graph, entities are represented as nodes and their relationships are represented as edges connecting nodes. Attributes can be associated with both nodes and edges.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A data processing method is provided. The method includes receiving data from a plurality of network-accessible data sources, generating a knowledge graph based on the data, and identifying particular nodes in the knowledge graph that are potentially ambiguous. For each of the particular nodes a semantic neighborhood is constructed including the particular node and a plurality of nodes within a particular degree of separation from the particular node, the particular node is omitted from the semantic neighborhood, a plurality of groups of connected nodes are determined in the semantic neighborhood, a plurality of instances of the particular node are defined based on the plurality of groups of connected nodes, each of the plurality of groups of connected nodes defining an instance of the particular node of the plurality of instances of the particular node, a plurality of substitute nodes are generated based on the plurality of instances of the particular node, and each of the plurality of groups of connected nodes are connected to one of the plurality of substitute nodes to update the knowledge graph. A query is received via a network for the updated knowledge graph. Query results are retrieved out of the updated knowledge graph, and the query results are rendered accessible via the network responsive to the query.

Further provided is a method for disambiguating entities in a knowledge graph. The method includes identifying a particular node in the knowledge graph that is potentially ambiguous and constructing a semantic neighborhood including the particular node and a plurality of nodes within a particular degree of separation from the particular node. The particular node is omitted from the semantic neighborhood, and a plurality of groups of connected nodes in the semantic neighborhood are determined. A plurality of instances of the particular node are defined based on the plurality of groups of connected nodes, each of the plurality of groups of connected nodes defining an instance of the particular node of the plurality of instances of the particular node. A plurality of substitute nodes are generated based on the plurality of instances of the particular node, and each of the plurality of groups of connected nodes is connected to one of the plurality of substitute nodes.

Further provided is another method for disambiguating entities in a knowledge graph. This other method includes identifying a particular node in the knowledge graph that is potentially ambiguous and constructing a semantic neighborhood including the particular node and a plurality of nodes within a particular degree of separation from the particular node. The particular node is disconnected from the semantic neighborhood, and a plurality of groups of connected nodes in the semantic neighborhood are determined. A plurality of instances of the particular node are defined based on the plurality of groups of connected nodes, each of the plurality of groups of connected nodes defining an instance of the particular node of the plurality of instances of the particular node. The particular node is split into a plurality of copied nodes based on the plurality of instances of the particular node, and each of the plurality of groups of connected nodes are connected to one of the plurality of copied nodes.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENT(S)

Embodiments of the invention are described below with reference to the drawing figures wherein like numerals represent like elements throughout. The terms "a", "an", and "one" as used herein do not denote a limitation of quantity, but rather denote the presence of at least one of the referenced items. Any directional signal such as top, bottom, left, right, upper and lower are taken with reference to the orientation in the various figures.

Figure 1:
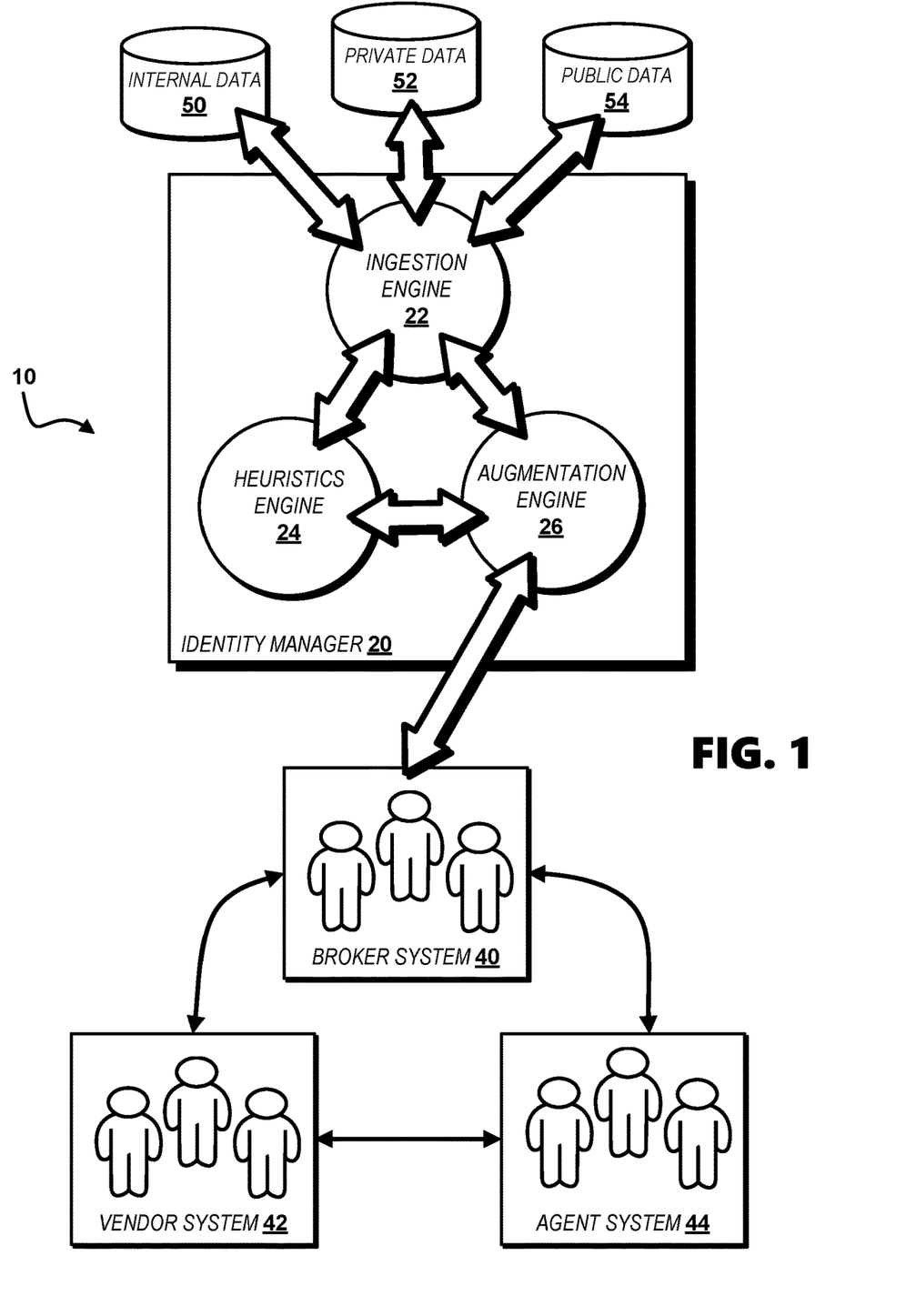
FIG. 1 is a diagram showing a system including an identity manager for disambiguating entities according to illustrative embodiments.

Referring to FIG. 1, a system 10 for disambiguating entity identity is provided in a communications network including one or more wired or wireless networks or a combination thereof, for example including a local area network (LAN), a wide area network (WAN), the Internet, mobile telephone networks, and wireless data networks such as Wi-Fi™ and 3G/4G/5G cellular networks. The system 10 includes a network-accessible processor-enabled identity manager 20 used in accessing data stores of varied identifying information, including for example data stores 50, 52, 54. The identity manager 20 is accessible by client computer systems 40, 42, 44. While the operation of the identity manager 20 is described herein with respect to network-connectable client computer systems 40, 42, 44 and data stores 50, 52, 54, one skilled in the art will recognize that the identity manager 20 can operate with other suitable wired or wireless network-connectable computing systems. The identity manager 20 includes an ingestion engine 22, a heuristics engine 24, and an augmentation engine 26. The identity manager 20 can be implemented on one or more network-connectable processor-enabled computing systems, for example in a peer-to-peer configuration, and need not be implemented on a single system at a single location. The identity manager 20 is configured for communication via a communications network with the network-connectable client computing systems 40, 42, 44 which are identified for exemplary purposes as a broker system 40, a vendor system 42, and an agent system 44. The identity manager 20 has further access to an internal data store 50, a private data store 52, and a public data store 54, which are beneficially accessible via network communication.

The identity manager 20 enables the acquiring, collecting, and analyzing of network-located data in real-time. The identity manager 20 can be implemented for example to collect and analyze non-public and public real estate data, which data can be rendered accessible to real estate brokers, vendors, and agents respectively via the broker system 40, the vendor system 42, and the agent system 44.

Figure 2:
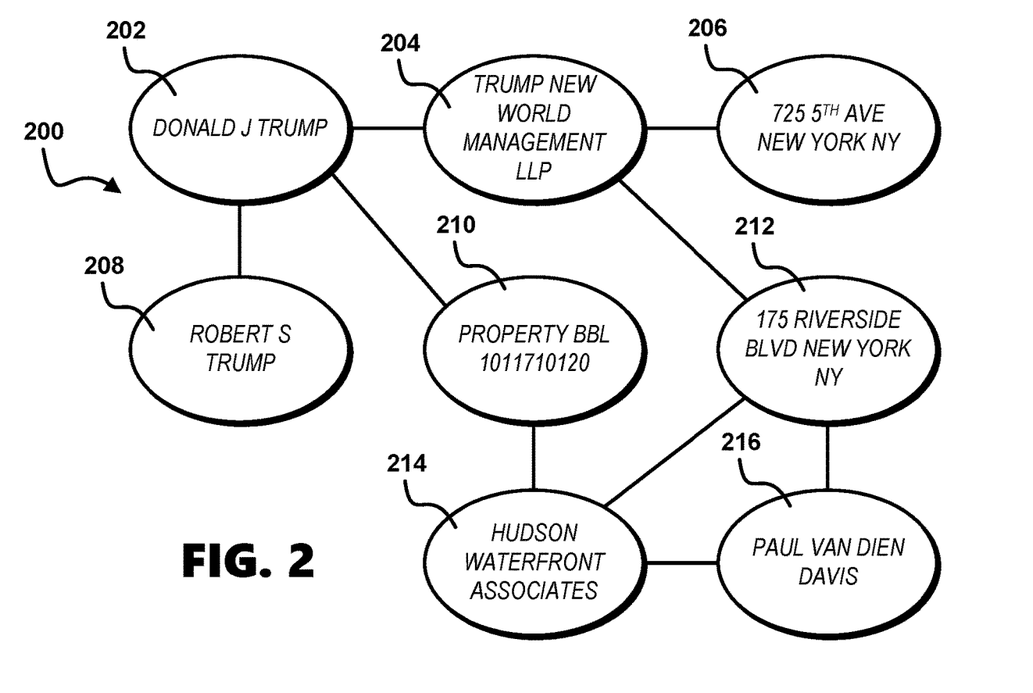
FIGS. 2, 3A, and 3B figuratively show exemplary knowledge graphs for visualizing methods according to illustrative embodiments.

The identity manager 20 via the ingestion engine 22, heuristics engine 24, and augmentation engine 26 enables knowledge graphs in which entities are for example real estate properties, addresses, people, and companies that operate in the real estate domain. Alternatively, the identity manager 20 can enable knowledge graphs including other types of entities. A knowledge graph is particularly useful for revealing hidden relationships between entities by traversing the graph from one node to another over the edges. Referring to FIG. 2, a first exemplary knowledge graph 200 reveals a relationship between "Donald J Trump" and "Paul Van Dien Davis." The relationship is revealed by starting at a Donald J Trump node 202, following an edge to a Property BBL (i.e., Borough, Block and Lot) 1011710120 node 210, following an edge to a Hudson Waterfront Associates node 214, and then following an edge to a Paul Van Dien Davis node 216. Also included in the first exemplary knowledge graph 200 are a Trump New World Management LLP node 204, a 725 $5^{th}$ Ave New York N.Y. node 206, a Robert S Trump node 208, and a 175 Riverside Blvd New York N.Y. node 212. Revealing hidden relationships may be very valuable in practical applications.

A challenge of knowledge graphs is their large scale (e.g., billions of nodes and edges). Neither the structure nor the content of even a modestly large knowledge graph can be humanly analyzed which creates a battery of problems. For example, it is difficult to assess the quality of the knowledge graph. And since a typical knowledge graph is constructed from many raw datasets, the quality of the knowledge graph cannot be taken for granted.

A particular challenge in constructing and maintaining a knowledge graph is ambiguous names of entities. Since a typical knowledge graph is constructed frons many raw datasets, it is not always clear that the same name found in a variety of datasets refers to the same entity. For example, the name "Jose Gomez" may belong to multiple people. If "Jose Gomez" is represented as one particular node in a particular knowledge graph, the particular node may connect unrelated parts of the knowledge graph, and create undesired traverse paths, which would lead to revealing relationships that do not actually exist. To improve the quality of a knowledge graph it would be beneficial to separate different entities with the same name.

As described herein, the task of separating different entities that bear the same name is called entity disambiguation. A method of entity disambiguation in a knowledge graph is provided which implies splitting a node with an ambiguous name into multiple nodes, each referring to one distinct entity. For example, a node marked "Jose Gomez" can be split into N number of nodes respectively marked "Jose Gomez 1," "Jose Gomez 2," . . . , "Jose Gomez N," "Jose Gomez N+1."

A potentially ambiguous node can be identified for example by determining a node as having a large degree, where "degree" refers to the number of immediate connections to the node. Alternatively, a potentially ambiguous node can be identified by determining the commonness of a name included in the node, where "commonness" refers to the number of occurrences of the name in a particular dataset (e.g., a large dataset external to the knowledge graph). Alternatively, a potentially ambiguous node can be identified by determining a combination of degree and commonness of the node.

As described herein, a semantic neighborhood of a particular node in a particular knowledge graph is defined as a set of neighbors within a particular degree of separation of the particular node. The degree of separation corresponding to the particular node is beneficially predetermined. For example the semantic neighborhood can be within one degree of separation from the particular node, in other words any or all nodes immediately connected (i.e., directly connected) to the particular node. In another example, the semantic neighborhood can be within two degrees of separation from the particular node, in other words any or all nodes immediately connected (i.e., directly connected) to the particular node and any or all nodes immediately connected to the nodes immediately connected to the nodes immediately connected to the particular node. In another example, the semantic neighborhood can be within more than two degrees of separation from the particular node (e.g., "n" degrees of separation).

In other words, a semantic neighborhood of node A in a knowledge graph is defined as a subgraph including edges and nodes around node A. A radius k of A's semantic neighborhood is defined as the distance (i.e., degrees of separation), in number of edges, between node A and its farthest node in the semantic neighborhood. A radius-k semantic neighborhood of node A is a subgraph including all edges and nodes within radius k (i.e., "k" degrees of separation) from A. For example, a process for constructing a radius-2 semantic neighborhood of a particular node can include (a) get immediate neighbors of the node, (b) for each immediate neighbor, get its neighbors, (c) for each pair of immediate neighbor's neighbors, check if they are connected to each other. Alternatively, other suitable process can be employed for determining a semantic neighborhood of a particular node.

A potentially ambiguous node in a knowledge graph has a very distinctive semantic neighborhood. Since an ambiguous node connects otherwise unrelated parts of a knowledge graph, its semantic neighborhood breaks into disconnected components by deleting the ambiguous node. After deleting a potentially ambiguous node, groups of connected nodes can be determined for example by a applying a connected components algorithm. An exemplary connected components algorithm is a part of a standard distribution of Python™ programming language, which algorithm executes a breadth first search ("BFS") at each node of a knowledge graph not yet covered at previous BFS executions, and which algorithm is linear in the number of edges because each edge in the knowledge graph has to be covered only once by one of the BFSs, and as such is very efficient. The connected component algorithm starts with executing a BFS from an arbitrary node. Once a BFS is completed, it covers one connected component. If the knowledge graph has other connected components, another BFS is executed from an arbitrarily chosen node that was not covered by the previous BFS(s), and so on until the entire knowledge graph is covered. The number of times a BFS is executed is the number of connected components in the knowledge graph.

Figure 3A:
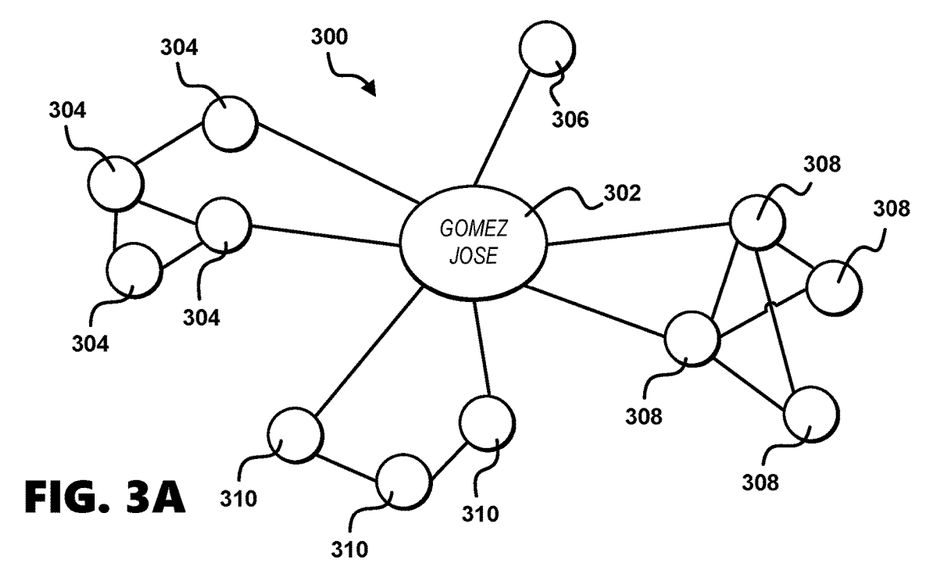

Referring to FIG. 3A, an exemplary knowledge graph portion 300 includes a particular node 302 including the name "Gomez Jose" (i.e., "Jose Gomez"). The particular node 302 connects four otherwise unrelated subgraphs within its semantic neighborhood. A first subgraph includes first nodes 304, a second subgraph includes a second node 306, a third subgraph includes a third nodes 308, and a fourth subgraph includes fourth nodes 310.

Figure 3B:
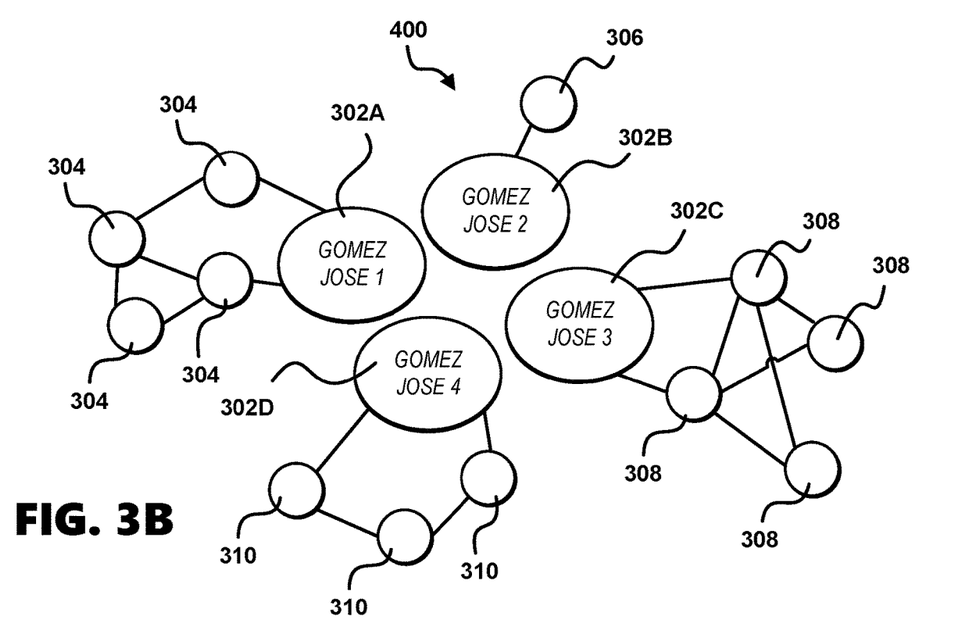

When the particular node 302 is removed, its semantic neighborhood is broken into four disconnected components including the first subgraph including the first nodes 304, the second subgraph including the second node 306, the third subgraph including the third nodes 308, and the fourth subgraph including the fourth nodes 310. It is concluded that the particular node 302 is in fact an aggregation of four nodes corresponding to four unrelated entities. Referring to FIG. 3B, the first, second, third, and fourth subgraphs are divided by replacing the particular node 302 with four unique nodes including a first replacement node 302A, second replacement node 302B, third replacement node 302C, and fourth replacement node 302D which respectively include a first instance of the name "Gomez Jose", a second instance of the name "Gomez Jose", a third instance of the name "Gomez Jose", and a fourth instance of the name "Gomez Jose."

In another exemplary implementation, a particular node can correspond to an ambiguous name of a particular person, such as "John Smith" or "Juan Rodriguez". The particular node is connected in a knowledge graph with nodes corresponding to residence addresses the particular person is associated with and nodes that correspond to the particular person's family members. Since the particular node is ambiguous, it is also connected to multiple unrelated addresses and multiple unrelated family members. In the exemplary implementation, a semantic neighborhood of the particular node is constructed and the particular node is deleted which results in groups of nodes each corresponding to one family and their residence addresses and corresponding to an instance of the ambiguous name. Then a separate instance of the particular node is associated with each of the groups of nodes corresponding to a respective particular person's family and their residence address(es) to resolve the ambiguity of the name of the particular person.

In yet another exemplary implementation, the particular node can correspond to an ambiguous address, for example an address of a large office building that hosts multiple unrelated companies. The ambiguous particular node is connected to nodes corresponding to multiple companies and multiple names of employees of those companies. A semantic neighborhood of the particular node is constructed and the particular node is deleted which results in groups of nodes each corresponding to one company and its employees. Then a separate instance of the particular node is associated with each of the groups of nodes corresponding to a respective company and its employees to resolve the ambiguity of the address.

Figure 4:
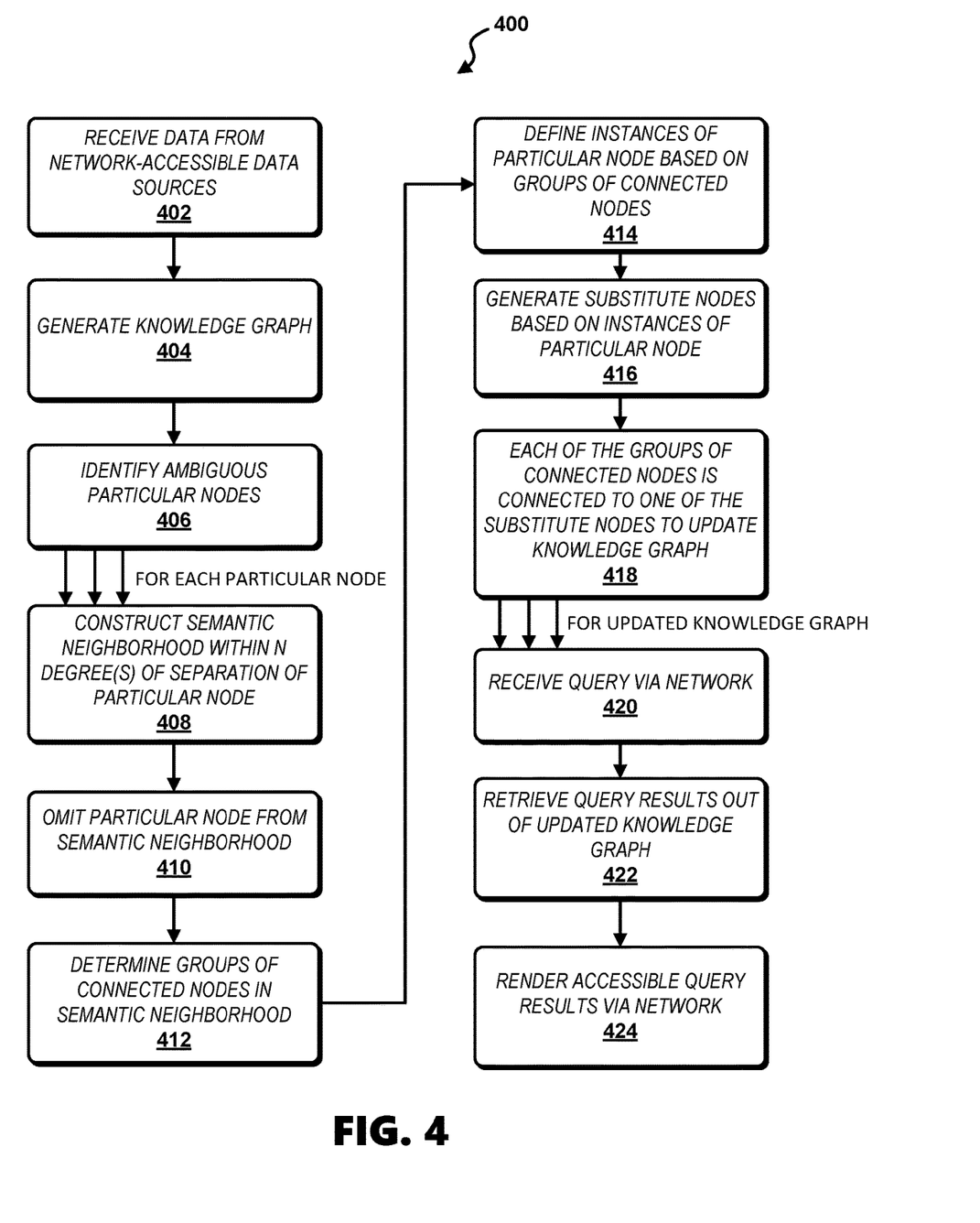
FIGS. 4 and 5 are diagrams showing data processing methods including methods for disambiguating entities in knowledge graphs according to illustrative embodiments.

Referring to FIG. 4, a diagram shows a data processing method 400 according to illustrative methods. The method 400 is described with reference to the components of system 10 shown in FIG. 1, and the method 400 can be performed by the identity manager 20 via the ingestion engine 22, heuristics engine 24, and augmentation engine 26 of the system 10. Alternatively, the method 400 can be performed via other suitable systems.

In a step 402, data is received from a plurality of network-accessible data sources. For example, the ingestion engine 22 of the identity manager 20 can receive the data from the internal data store 50, the private data store 52, and the public data store 54. A knowledge graph is generated based on the data (step 404), for example via the heuristics engine 24. Particular nodes in the knowledge graph are identified that are potentially ambiguous (step 406), for example via the heuristics engine 24. The knowledge graph can include for example hundreds, thousands, or millions of nodes, and the identified potentially ambiguous nodes can include hundreds, thousands, or millions of nodes, for instance one hundred or more nodes or one thousand or more nodes.

To determine each of the potentially ambiguous particular nodes, a number of immediate connections to the particular node can be determined (i.e., the number of first degree neighbors of the particular node), and the particular node can be determined to be potentially ambiguous based on the number of immediate connections to the particular node (i.e., based on the number of first degree neighbors of the particular node). Alternatively, a number of occurrences of a particular name in an external data source can be determined, the particular node can be determined to include the particular name, and the particular node in the knowledge graph can be determined to be potentially ambiguous based on the number of occurrences of the particular name in the external data source and based on the determining that the particular node includes the particular name. Alternatively, a number of immediate connections to the particular node can be determined, a number of occurrences of a particular name in an external data source can be determined, the particular node can be determined to include the particular name, and the particular node in the knowledge graph can be determined to be potentially ambiguous based on the number of immediate connections to the particular node, based on the number of occurrences of the particular name in the external data source, and based on the determining that the particular node includes the particular name.

For each of the particular nodes, a semantic neighborhood is constructed including the particular node and a plurality of nodes within a particular degree of separation from the particular node (step 408). Constructing the semantic neighborhood beneficially includes constructing the semantic neighborhood to include the plurality of nodes within two degrees of separation from the particular node. Alternatively, constructing the semantic neighborhood can include determining first degree neighbors of the particular node, and determining connections between the first degree neighbors. Alternatively, constructing the semantic neighborhood can include determining first degree neighbors of the particular node, determining connections between the first degree neighbors, determining second degree neighbors of the particular node connected to the first degree neighbors of the particular node, and determining connections between the second degree neighbors.

The particular node is omitted from the semantic neighborhood (step 410), and a plurality of groups of connected nodes are determined in the semantic neighborhood (step 412). In an illustrative implementation, a connected components algorithm can be applied to the semantic neighborhood of each potentially ambiguous particular node to determine the plurality of groups of connected nodes. For example, to determine the plurality of groups of connected nodes in the semantic neighborhood of each potentially ambiguous particular node, a plurality of breadth first searches can be executed on the plurality of nodes within the particular degree of separation from the particular node to generate a plurality of breadth first search results, and the plurality of groups of connected nodes in the semantic neighborhood can be determined based on the plurality of breadth first search results. The plurality of breadth first searches are beneficially executed after the omitting of the particular node from the semantic neighborhood.

Further, for each of the particular nodes, a plurality of instances of the particular node are defined based on the plurality of groups of connected nodes, each of the plurality of groups of connected nodes defining an instance of the particular node of the plurality of instances of the particular node (step 414), a plurality of substitute nodes are generated based on the plurality of instances of the particular node (step 416), and each of the plurality of groups of connected nodes is connected to one of the plurality of substitute nodes (step 418) to update the knowledge graph. In a step 420, a query is received via a network for the updated knowledge graph. Query results are retrieved out of the updated knowledge graph (step 422), and the query results are rendered accessible via the network responsive to the query (step 424).

Figure 5:
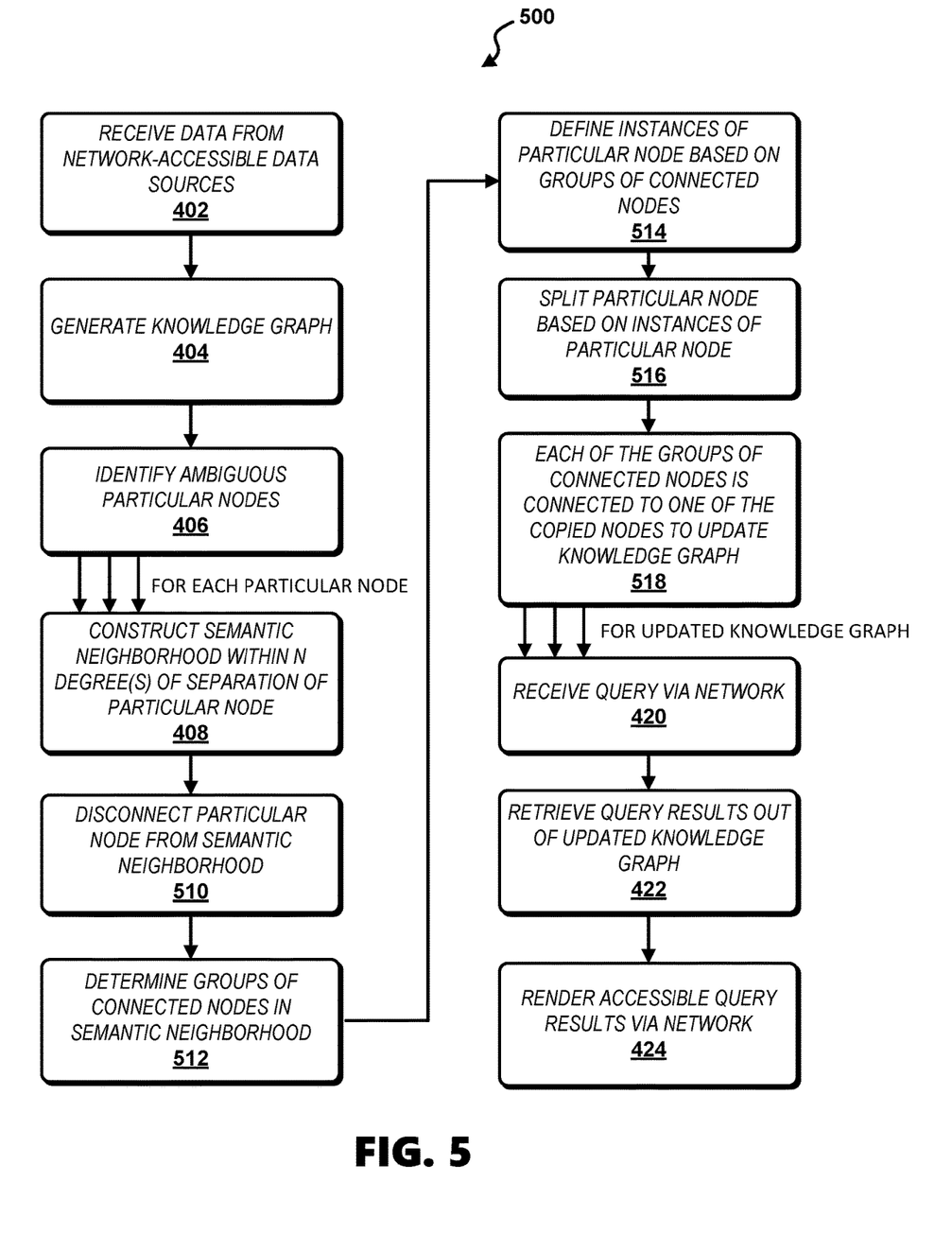

Referring to FIG. 5, a diagram shows another data processing method 500 according to illustrative methods. The method 500 includes steps 402, 404, 406, 408 and steps 420, 422, 424 of the method 400. The method 500 implements steps 510, 512, 514, 516 518 in place of steps 410, 412, 414, 416, 418 of the method 400. The method 500 is described with reference to the components of system 10 shown in FIG. 1, and the method 500 can be performed by the identity manager 20 via the ingestion engine 22, heuristics engine 24, and augmentation engine 26 of the system 10. Alternatively, the method 500 can be performed via other suitable systems.

The method 500 begins with steps 402, 404, 406, 408 as described by the foregoing with reference to the method 400. In the step 510, the particular node is disconnected from the semantic neighborhood. A plurality of groups of connected nodes in the semantic neighborhood are determined (step 512). Beneficially, a plurality of breadth first searches are executed on the plurality of nodes within the particular degree of separation from the particular node after disconnecting the particular node from the semantic neighborhood to generate a plurality of breadth first search results, and the plurality of groups of connected nodes in the semantic neighborhood are determined based on the plurality of breadth first search results.

A plurality of instances of the particular node are defined based on the plurality of groups of connected nodes, each of the plurality of groups of connected nodes defining an instance of the particular node of the plurality of instances of the particular node (step 514). The particular node is split into a plurality of copied nodes based on the plurality of instances of the particular node (step 516). Each of the plurality of groups of connected nodes is connected to one of the plurality of copied nodes (step 518) to update the knowledge graph, and the method 500 continues at step 420 as described by the foregoing with reference to the method 400.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A data processing method comprising:
receiving data from a plurality of network-accessible data sources;
generating a knowledge graph based on the data;
identifying particular nodes in the knowledge graph that are potentially ambiguous, for each of the particular nodes:
constructing a semantic neighborhood comprising the particular node and a plurality of nodes within a particular degree of separation from the particular node;
omitting the particular node from the semantic neighborhood;
determining a plurality of groups of connected nodes in the semantic neighborhood;
defining a plurality of instances of the particular node based on the plurality of groups of connected nodes, each of the plurality of groups of connected nodes defining an instance of the particular node of the plurality of instances of the particular node;
generating a plurality of substitute nodes based on the plurality of instances of the particular node; and
connecting each of the plurality of groups of connected nodes to one of the plurality of substitute nodes to update the knowledge graph;
receiving a query via a network for the updated knowledge graph;
retrieving query results out of the updated knowledge graph; and
rendering the query results accessible via the network responsive to the query.

2. The method of claim 1, wherein identifying the particular nodes comprises identifying at least one hundred particular nodes.

3. The method of claim 1, wherein identifying the particular nodes comprises identifying at least one thousand particular nodes.

4. A data processing method comprising:
receiving data from a plurality of network-accessible data sources;
generating a knowledge graph based on the data;
identifying a particular node that is potentially ambiguous in the knowledge graph;
constructing a semantic neighborhood comprising the particular node and a plurality of nodes within a particular degree of separation from the particular node;
omitting the particular node from the semantic neighborhood;
determining a plurality of groups of connected nodes in the semantic neighborhood;
defining a plurality of instances of the particular node based on the plurality of groups of connected nodes, each of the plurality of groups of connected nodes defining an instance of the particular node of the plurality of instances of the particular node;
generating a plurality of substitute nodes based on the plurality of instances of the particular node;
connecting each of the plurality of groups of connected nodes to one of the plurality of substitute nodes to update the knowledge graph;
retrieving query results out of the updated knowledge graph; and
rendering the query results accessible via a network.

5. The method of claim 4, further comprising:
determining a number of immediate connections to the particular node; and
determining that the particular node is potentially ambiguous based on the number of immediate connections to the particular node.

6. The method of claim 4, further comprising:
determining a number of occurrences of a particular name in an external data source;
determining that the particular node comprises the particular name; and
determining the particular node in the knowledge graph is potentially ambiguous based on the number of occurrences of the particular name in the external data source and the determining that the particular node comprises the particular name.

7. The method of claim 4, further comprising:
determining a number of immediate connections to the particular node;
determining a number of occurrences of a particular name in an external data source;
determining that the particular node comprises the particular name; and
determining the particular node in the knowledge graph is potentially ambiguous based on the number of immediate connections to the particular node, the number of occurrences of the particular name in the external data source, and the determining that the particular node comprises the particular name.

8. The method of claim 4, further comprising:
executing a plurality of breadth first searches on the plurality of nodes within the particular degree of separation from the particular node after the omitting the particular node from the semantic neighborhood to generate a plurality of breadth first search results; and
determining the plurality of groups of connected nodes in the semantic neighborhood based on the plurality of breadth first search results.

9. The method of claim 4, wherein constructing the semantic neighborhood comprising the plurality of nodes within the particular degree of separation from the particular node comprises constructing the semantic neighborhood comprising the plurality of nodes within two degrees of separation from the particular node.

10. The method of claim 4, wherein constructing the semantic neighborhood comprises:
determining first degree neighbors of the particular node; and
determining connections between the first degree neighbors.

11. The method of claim 4, wherein constructing the semantic neighborhood comprises:
determining first degree neighbors of the particular node;
determining connections between the first degree neighbors;
determining second degree neighbors of the particular node connected to the first degree neighbors of the particular node; and
determining connections between the second degree neighbors.

12. A data processing method comprising:
receiving data from a plurality of network-accessible data sources;
generating a knowledge graph based on the data;
identifying a particular node that is potentially ambiguous in the knowledge graph;
constructing a semantic neighborhood comprising the particular node and a plurality of nodes within a particular degree of separation from the particular node;
disconnecting the particular node from the semantic neighborhood;
determining a plurality of groups of connected nodes in the semantic neighborhood;
defining a plurality of instances of the particular node based on the plurality of groups of connected nodes, each of the plurality of groups of connected nodes defining an instance of the particular node of the plurality of instances of the particular node;
splitting the particular node into a plurality of copied nodes based on the plurality of instances of the particular node;
connecting each of the plurality of groups of connected nodes to one of the plurality of copied nodes to update the knowledge graph;
retrieving query results out of the updated knowledge graph; and
rendering the query results accessible via a network.

13. The method of claim 12, further comprising:
executing a plurality of breadth first searches on the plurality of nodes within the particular degree of separation from the particular node after disconnecting the particular node from the semantic neighborhood to generate a plurality of breadth first search results; and
determining the plurality of groups of connected nodes in the semantic neighborhood based on the plurality of breadth first search results.

14. A data processing method comprising:
receiving data from a plurality of network-accessible data sources;
generating a knowledge graph based on the data;
identifying particular nodes in the knowledge graph that are potentially ambiguous, for each of the particular nodes:

constructing a semantic neighborhood comprising the particular node and a plurality of nodes within a particular degree of separation from the particular node;
omitting the particular node from the semantic neighborhood;
determining a plurality of groups of connected nodes in the semantic neighborhood, the plurality of groups of connected nodes connected to the particular node prior to the omitting of the particular node, and the plurality of groups of connected nodes not connected to each other within the semantic neighborhood after the omitting of the particular node;
defining a plurality of instances of the particular node based on the plurality of groups of connected nodes, each of the plurality of groups of connected nodes defining an instance of the particular node of the plurality of instances of the particular node;
generating a plurality of substitute nodes based on the plurality of instances of the particular node; and
connecting each of the plurality of groups of connected nodes to one of the plurality of substitute nodes to update the knowledge graph;
receiving a query via a network for the updated knowledge graph;
retrieving query results out of the updated knowledge graph; and
rendering the query results accessible via the network responsive to the query.

15. The method of claim 14, wherein identifying the particular nodes comprises identifying at least one hundred particular nodes.

16. The method of claim 14, wherein identifying the particular nodes comprises identifying at least one thousand particular nodes.

17. A data processing method comprising:
receiving data from a plurality of network-accessible data sources;
generating a knowledge graph based on the data;
identifying a particular node that is potentially ambiguous in the knowledge graph;
constructing a semantic neighborhood comprising the particular node and a plurality of nodes within a particular degree of separation from the particular node;
omitting the particular node from the semantic neighborhood;
determining a plurality of groups of connected nodes in the semantic neighborhood, the plurality of groups of connected nodes connected to the particular node prior to the omitting of the particular node, and the plurality of groups of connected nodes not connected to each other within the semantic neighborhood after the omitting of the particular node;
defining a plurality of instances of the particular node based on the plurality of groups of connected nodes, each of the plurality of groups of connected nodes defining an instance of the particular node of the plurality of instances of the particular node;
generating a plurality of substitute nodes based on the plurality of instances of the particular node;
connecting each of the plurality of groups of connected nodes to one of the plurality of substitute nodes to update the knowledge graph;
retrieving query results out of the updated knowledge graph; and
rendering the query results accessible via a network.

18. The method of claim 17, further comprising:
determining a number of immediate connections to the particular node; and
determining that the particular node is potentially ambiguous based on the number of immediate connections to the particular node.

19. The method of claim 17, further comprising:
determining a number of occurrences of a particular name in an external data source;
determining that the particular node comprises the particular name; and
determining the particular node in the knowledge graph is potentially ambiguous based on the number of occurrences of the particular name in the external data source and the determining that the particular node comprises the particular name.

20. The method of claim 17, further comprising:
determining a number of immediate connections to the particular node;
determining a number of occurrences of a particular name in an external data source;
determining that the particular node comprises the particular name; and
determining the particular node in the knowledge graph is potentially ambiguous based on the number of immediate connections to the particular node, the number of occurrences of the particular name in the external data source, and the determining that the particular node comprises the particular name.

21. The method of claim 17, further comprising:
executing a plurality of breadth first searches on the plurality of nodes within the particular degree of separation from the particular node after the omitting the particular node from the semantic neighborhood to generate a plurality of breadth first search results; and
determining the plurality of groups of connected nodes in the semantic neighborhood based on the plurality of breadth first search results.

22. The method of claim 17, wherein constructing the semantic neighborhood comprising the plurality of nodes within the particular degree of separation from the particular node comprises constructing the semantic neighborhood comprising the plurality of nodes within two degrees of separation from the particular node.

23. The method of claim 17, wherein constructing the semantic neighborhood comprises:
determining first degree neighbors of the particular node; and
determining connections between the first degree neighbors.

24. The method of claim 17, wherein constructing the semantic neighborhood comprises:
determining first degree neighbors of the particular node;
determining connections between the first degree neighbors;
determining second degree neighbors of the particular node connected to the first degree neighbors of the particular node; and
determining connections between the second degree neighbors.

25. A data processing method comprising:
receiving data from a plurality of network-accessible data sources;
generating a knowledge graph based on the data;
identifying a particular node that is potentially ambiguous in the knowledge graph;

constructing a semantic neighborhood comprising the particular node and a plurality of nodes within a particular degree of separation from the particular node;
disconnecting the particular node from the semantic neighborhood;
determining a plurality of groups of connected nodes in the semantic neighborhood, the plurality of groups of connected nodes created by the disconnecting of the particular node from the semantic neighborhood, wherein the plurality of groups of connected nodes are not connected to each other within the semantic neighborhood after the disconnecting of the particular node from the semantic neighborhood;
defining a plurality of instances of the particular node based on the plurality of groups of connected nodes, each of the plurality of groups of connected nodes defining an instance of the particular node of the plurality of instances of the particular node;
splitting the particular node into a plurality of copied nodes based on the plurality of instances of the particular node;
connecting each of the plurality of groups of connected nodes to one of the plurality of copied nodes to update the knowledge graph;
retrieving query results out of the updated knowledge graph; and
rendering the query results accessible via a network.

26. The method of claim 25, further comprising:
executing a plurality of breadth first searches on the plurality of nodes within the particular degree of separation from the particular node after disconnecting the particular node from the semantic neighborhood to generate a plurality of breadth first search results; and
determining the plurality of groups of connected nodes in the semantic neighborhood based on the plurality of breadth first search results.

27. A data processing method comprising:
receiving data from a plurality of network-accessible data sources;
generating a knowledge graph based on the data;
identifying particular nodes in the knowledge graph that are potentially ambiguous, for each of the particular nodes:
    constructing a semantic neighborhood comprising the particular node and a plurality of nodes within a particular degree of separation from the particular node;
    omitting the particular node from the semantic neighborhood;
    determining a plurality of groups of connected nodes in the semantic neighborhood, the plurality of groups of connected nodes connected to the particular node prior to the omitting of the particular node, and the plurality of groups of connected nodes less connected to each other after the omitting of the particular node;
    defining a plurality of instances of the particular node based on the plurality of groups of connected nodes, each of the plurality of groups of connected nodes defining an instance of the particular node of the plurality of instances of the particular node;
    generating a plurality of substitute nodes based on the plurality of instances of the particular node; and
    connecting each of the plurality of groups of connected nodes to one of the plurality of substitute nodes to update the knowledge graph;
receiving a query via a network for the updated knowledge graph;
retrieving query results out of the updated knowledge graph; and
rendering the query results accessible via the network responsive to the query.

28. The method of claim 27, wherein the plurality of groups of connected nodes are connected to the particular node prior to the omitting of the particular node, and the plurality of groups of connected nodes are not connected to each other after the omitting of the particular node.

* * * * *

UNITED STATES PATENT AND TRADEMARK OFFICE
CERTIFICATE OF CORRECTION

| | |
|---|---|
| PATENT NO. | : 11,615,150 B2 |
| APPLICATION NO. | : 17/067170 |
| DATED | : March 28, 2023 |
| INVENTOR(S) | : Ron Bekkerman |

It is certified that error appears in the above-identified patent and that said Letters Patent is hereby corrected as shown below:

In the Specification

At Column 4, Line 7, after the word "constructed", delete "frons" and insert therefor --from--.

Signed and Sealed this
Thirteenth Day of June, 2023

Katherine Kelly Vidal
*Director of the United States Patent and Trademark Office*